United States Patent
Eatedali

(10) Patent No.: US 11,263,670 B2
(45) Date of Patent: Mar. 1, 2022

(54) SYSTEMS AND METHODS FOR DYNAMICALLY MODIFYING VIDEO GAME CONTENT BASED ON NON-VIDEO GAMING CONTENT BEING CONCURRENTLY EXPERIENCED BY A USER

(71) Applicant: Activision Publishing, Inc., Santa Monica, CA (US)

(72) Inventor: Josiah Eatedali, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/685,967

(22) Filed: Nov. 15, 2019

(65) Prior Publication Data
US 2020/0160405 A1 May 21, 2020

Related U.S. Application Data

(60) Provisional application No. 62/769,188, filed on Nov. 19, 2018.

(51) Int. Cl.
| | |
|---|---|
| *G06Q 30/02* | (2012.01) |
| *G06Q 30/06* | (2012.01) |
| *G06F 40/30* | (2020.01) |
| *G06Q 50/00* | (2012.01) |
| *A63F 13/65* | (2014.01) |

(52) U.S. Cl.
CPC ......... *G06Q 30/0277* (2013.01); *A63F 13/65* (2014.09); *G06F 40/30* (2020.01); *G06Q 30/0631* (2013.01); *G06Q 50/01* (2013.01)

(58) Field of Classification Search
None
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Yoo et al., "PokerFace: Game players themselves are truly memorable," 2010 2nd International IEEE Consumer Electronics Society's Games Innovations Conference, 2010, pp. 1-5. (Year: 2010).*

*Primary Examiner* — Christopher B Tokarczyk
(74) *Attorney, Agent, or Firm* — Novel IP

(57) ABSTRACT

The disclosed systems and methods integrate gaming functionality with viewing a video program. Systems and methods for generating an interactive multimedia game for a user during the viewing of a video program by the user includes a host computer that generates the game in a context of the video program viewed on a first graphical user interface and recommends the video game to the user. The user may opt to engage with the video game on a second graphical user interface, which may be overlaid on the first graphical user interface.

19 Claims, 6 Drawing Sheets

(56) References Cited

U.S. PATENT DOCUMENTS

| | | |
|---|---|---|
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,263,505 B1 | 7/2001 | Walker |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |

(56) References Cited

U.S. PATENT DOCUMENTS

| | | |
|---|---|---|
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,342,490 B1* | 5/2016 | Taylor .................. G06F 16/95 |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2005/0020359 A1* | 1/2005 | Ackley .................. A63F 13/45 |
| | | 463/31 |
| 2009/0113448 A1 | 4/2009 | Smith |
| 2011/0244954 A1* | 10/2011 | Goldman ............... A63F 13/53 |
| | | 463/30 |
| 2011/0321075 A1 | 12/2011 | Brunkhorst |
| 2014/0179439 A1* | 6/2014 | Miura .................... A63F 13/73 |
| | | 463/42 |
| 2014/0344725 A1 | 11/2014 | Bates |
| 2015/0141145 A1* | 5/2015 | Perlman ........... H04N 21/21805 |
| | | 463/31 |
| 2016/0184704 A1* | 6/2016 | Garcia Navarro ...... A63F 13/32 |
| | | 463/31 |
| 2016/0191671 A1 | 6/2016 | Dawson |
| 2018/0316944 A1* | 11/2018 | Todd ................. H04N 21/4753 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |

(56) References Cited

FOREIGN PATENT DOCUMENTS

| | | |
|---|---|---|
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | WO-2004049671 A1 * | 6/2004 ............ H04L 69/08 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEMS AND METHODS FOR DYNAMICALLY MODIFYING VIDEO GAME CONTENT BASED ON NON-VIDEO GAMING CONTENT BEING CONCURRENTLY EXPERIENCED BY A USER

CROSS-REFERENCE

The present specification relies on U.S. Patent Provisional Application No. 62/769,188, entitled "Systems and Methods for Dynamically Modifying Video Game Content Based on Non-Video Gaming Content Being Concurrently Experienced by a User" and filed on Nov. 19, 2018, for priority and is hereby incorporated by reference in its entirety.

FIELD

The present specification relates to systems and methods for dynamically modifying a gaming experience or gaming content based on non-video gaming content being concurrently experienced by a user, typically on a media channel or platform different than the video game. More particularly, the present specification relates to systems and methods that extracts data from a user's media experience, for example, watching a video stream or broadcast video, and uses that data to dynamically recommend a video game for the user to play, generate a video game for the user to play, or modify content of the video game being played, as the user experiences the video stream or broadcast video.

BACKGROUND

Watching video streams or broadcast video, while concurrently playing video games, is a popular activity. People watching videos typically experience the viewed content in an inactive or passive manner, while video game-playing tends to be more active and engaging.

Prior art approaches have focused on generating supplemental content related to a television broadcast. For example, U.S. Pat. No. 6,263,505 teaches the provision of additional audio and visual tracks as supplemental information synchronized to the action and events occurring in a video program, thereby enabling video program viewers to receive synchronized supplemental information related to video programs and to request and receive the synchronized supplemental information through a computer data communication network interface. More specifically, the '505 patent discloses a viewer making a request for the supplemental information through a computer data communication network, providing the program identification and synchronization information integrated with the video program being viewed, and receiving the requested supplemental information synchronized to the video program through the computer data communication network.

Similarly, U.S. Patent Publication No. 2011/0321075 discloses dynamically modifying media content to be presented to a group of viewers using a plurality of content filters, each of which has multiple sub-components and is based on a member profile of a different member of a media viewing audience. Media content is then modified, based on the plurality of content filters, to create a dynamically modified media content for viewing by the media viewing audience.

However, notwithstanding the prior art, there has yet to be disclosed systems and methods for actually integrating, effecting or modifying video game play concurrent with a separate video stream or broadcast video. More specifically, there is a need to contextually integrate video games being concurrently experienced with a video stream or broadcast video being delivered via a separate media channel, thereby transforming a passive viewing experience into a more engaging and active one. There is also a need to provide a richer, more fun, and more intriguing viewer experience thus increasing viewer engagement and attracting viewers toward video gaming experiences that are configured to offer a relevant and potentially rewarding outcomes in the context of a video stream or broadcast video.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer implemented method for generating an interactive multimedia video game for a user during a viewing of a video program by the user, the method being implemented in a host computer having one or more physical processors programmed with computer program instruction that, when executed by the one or more physical processors, cause the host computer to perform the method, the method comprising: receiving metadata associated with the video program, wherein the video program is delivered to the user through a first media channel and viewed through a first graphical user interface; semantically analyzing the metadata to determine a context of the video program; based on the context of the video program, recommending an interactive multimedia game and generating a second graphical user interface, via a second media channel, to display the recommendation, wherein the recommendation comprises a first option associated with engaging in the interactive multimedia game; receiving, at the host computer, data indicative of whether the user selected the first option; and using the host computer, delivering, through the second media channel, the interactive multimedia game if the data is indicative of the user selecting the first option.

Optionally, recommending the interactive multimedia game further comprises identifying the interactive multimedia game based on the context of the program from a game database.

Optionally, the second graphical user interface is overlaid on a portion of or all of the first graphical user interface.

Optionally, the video program is at least one of a broadcast television or Internet-based streaming program.

Optionally, the computer implemented method further comprises accessing a social network feed based on the metadata. Optionally, the computer implemented method further comprises semantically analyzing the social network feed to determine the context of the video program.

The interactive multimedia game may be configured as a downloadable executable that, if activated by the user, allows the user to engage with the interactive multimedia game.

The interactive multimedia game may be configured as a scripted advertisement that, if activated by the user, allows the user to engage with the interactive multimedia game.

Optionally, the computer implemented method further comprises, using the host computer, directing the user to a game server if the user interacts with the second graphical user interface.

Optionally, the semantically analyzing the metadata to determine a context of the video program comprises determining at least one event in the video program. Optionally, determining the at least one event comprises determining one or more of identity of persons in the video program, actions performed in the video program, and goals achieved in the video program.

Optionally, the at least one of the receiving, the analyzing, and the recommending are executed manually on the host computer.

The present specification also discloses a computer implemented method for generating an interactive multimedia game for a user during a viewing of a video program by the user, the method being implemented in a host computer having one or more physical processors programmed with computer program instruction that, when executed by the one or more physical processors, cause the host computer to perform the method, the method comprising: receiving metadata associated with the video program, wherein the video program is delivered to the user through a first media channel and viewed through a first graphical user interface, wherein the program is viewed on a first graphical user interface; analyzing the metadata to determine a context of the video program; creating an interactive multimedia game based on the context of the program; based on the context of the video program, recommending the interactive multimedia game and generating a second graphical user interface, via a second media channel, to display the recommendation, wherein the recommendation comprises a first option associated with engaging in the interactive multimedia game; receiving, at the host computer, data indicative of whether the user selected the first option; using the host computer, delivering, through the second media channel, the interactive multimedia game if the data is indicative of the user selecting the first option.

Optionally, recommending the interactive multimedia game further comprises identifying the interactive multimedia game based on the context of the program from a game database.

Optionally, the second graphical user interface is overlaid on a portion of or all of the first graphical user interface.

Optionally, the computer implemented method further comprises accessing a social network feed based on the metadata. Optionally, the computer implemented method further comprises semantically analyzing the social network feed to determine the context of the video program.

The interactive multimedia game may be configured as a downloadable executable that, if activated by the user, allows the user to engage with the interactive multimedia game.

The interactive multimedia game may be configured as a scripted advertisement that, if activated by the user, allows the user to engage with the interactive multimedia game.

Optionally, the computer implemented method further comprises, using the host computer, directing the user to a game server if the user interacts with the second graphical user interface.

Optionally, analyzing the metadata to determine a context of the video program comprises determining at least one event in the video program. Optionally, determining the at least one event comprises determining one or more of identity of persons in the video program, actions performed in the video program, and goals achieved in the video program.

Optionally, the at least one of the receiving, the analyzing, the creating, and the recommending are executed manually on the host computer.

The present specification also discloses a computer implemented method for generating an interactive multimedia game for a user during a viewing of a video program by the user, the method being implemented in a host computer having one or more physical processors programmed with computer program instruction that, when executed by the one or more physical processors, cause the host computer to perform the method, the method comprising: receiving metadata associated with the video program, wherein the video program is delivered to the user through a first media channel and viewed through a first graphical user interface, wherein the program is viewed on a first graphical user interface; analyzing the metadata to determine a context of the video program; creating an interactive multimedia game based on the context of the program; based on the context of the video program, recommending the interactive multimedia game and generating a second graphical user interface, via a second media channel, to display the recommendation, wherein the recommendation comprises a first option associated with engaging in the interactive multimedia game; receiving, at the host computer, data indicative of whether the user selected the first option; using the host computer, delivering, through the second media channel, the interactive multimedia game if the data is indicative of the user selecting the first option; and using the host computer, modifying the interactive multimedia game while the video program is playing if the data is indicative of the user selecting the first option.

Optionally, modifying the interactive multimedia game comprises adding game elements to the interactive multimedia game.

Optionally, the game elements match the context of the video program.

Optionally, recommending the interactive multimedia game further comprises identifying the interactive multimedia game based on the context of the program from a game database.

Optionally, the second graphical user interface is overlaid on a portion of or all of the first graphical user interface.

Optionally, the computer implemented method further comprises accessing a social network feed based on the metadata. Optionally, the computer implemented method further comprises semantically analyzing the social network feed to determine the context of the video program.

The interactive multimedia game may be configured as a downloadable executable that, if activated by the user, allows the user to engage with the interactive multimedia game.

The interactive multimedia game may be configured as a scripted advertisement that, if activated by the user, allows the user to engage with the interactive multimedia game.

Optionally, the computer implemented method further comprises, using the host computer, directing the user to a game server if the user interacts with the second graphical user interface.

Optionally, analyzing the metadata to determine a context of the video program comprises determining at least one event in the video program. Optionally, determining the at least one event comprises determining one or more of identity of persons in the video program, actions performed in the video program, and goals achieved in the video program.

Optionally, the at least one of the receiving, the analyzing, the creating, the recommending, and the modifying are executed manually on the host computer.

The present specification also discloses a computer implemented method for generating an interactive multimedia video game being played by a user over a first graphical user interface during a broadcast of a video program, the method being implemented in a host computer having one or more physical processors programmed with computer program instruction that, when executed by the one or more physical processors, cause the host computer to perform the method, the method comprising: analyzing the video program to determine a context of, and one or more events within, the video program; matching the context of the video program with the interactive multimedia game being played by the user; based on the occurrence of the one or more events in the video program, recommending an interactive multimedia game for each event and generating a second graphical user interface, via a media channel, to display the recommendation, wherein the recommendation comprises a first option associated with engaging in the interactive multimedia game; receiving, at the host computer, data indicative of whether the user selected the first option; and using the host computer, delivering, through the second media channel, the interactive multimedia game if the data is indicative of the user selecting the first option.

Optionally, recommending the interactive multimedia game further comprises identifying the interactive multimedia game based on the context of the program from a game database.

Optionally, recommending the interactive multimedia game further comprises creating in real time the interactive multimedia game based on the context of the program.

Optionally, recommending the interactive multimedia game further comprises generating rewards within the interactive multimedia game.

Optionally, the second graphical user interface is overlaid on a portion of or all of the first graphical user interface.

Optionally, the video program is at least one of a broadcast television or Internet-based streaming program.

Optionally, analyzing the video program comprises accessing a social network feed related to the video program.

The interactive multimedia game may be configured as a downloadable executable that, if activated by the user, allows the user to engage with the interactive multimedia game.

The interactive multimedia game may be configured as a scripted advertisement that, if activated by the user, allows the user to engage with the interactive multimedia game.

Optionally, the computer implemented method further comprises, using the host computer, directing the user to a game server if the user interacts with the second graphical user interface.

Optionally, the at least one of the analyzing, the matching, and the recommending are executed manually on the host computer.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

The term "viewing, transmitting, receiving or transporting media content over a separate media channel" shall mean, referring to the Open Systems Interconnection Model of communications, the viewing, transmission, reception or transportation of media content, such as video, images, or audio, over an application layer, presentation layer, session layer, transport layer, network layer, data link layer, or physical layer that is different from the application layer, presentation layer, session layer, transport layer, network layer, data link layer, or physical layer being used to view, transmit, receive, or transport other media. Conversely, different media content are not being viewed, transmitted, received, or transported over different channels if they share the same application layer, presentation layer, session layer, transport layer, network layer, data link layer, and physical layer.

The term "video program" shall mean any collection of video content configured to be transmitted over any type of network, including Internet, private ethernet, cellular, broadcast, or cable.

The term "video game" shall mean any collection of media content configured to be presented through a user interface, receive user feedback, and provide an interactive response in order to facilitate some type of gaming objective.

Figure 1:
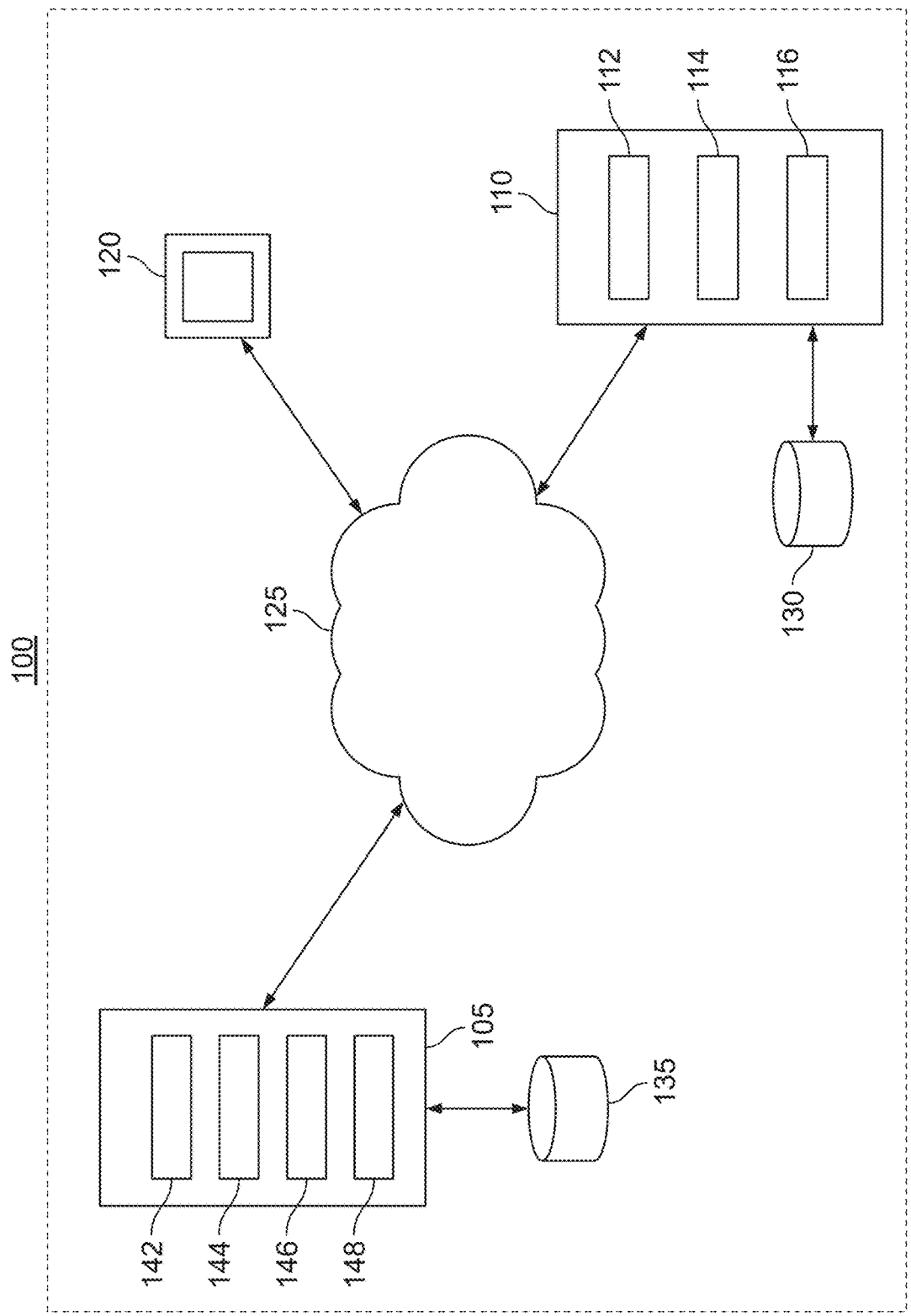
FIG. 1 illustrates an exemplary system environment for providing an interactive game experience in the context of a video program concurrently viewed by a user, in accordance with some embodiments of the present specification.

FIG. 1 illustrates an exemplary system environment 100 for providing an interactive game experience in the context of a video program being concurrently viewed by a user on a separate media channel, in accordance with some embodiments of the present specification. The environment 100 comprises at least one web server 105, at least one game server 110, and at least one client device 120 in data communication with each other through a network 125. The servers 105, 110 can be any computing device having one or more processors and one or more computer-readable storage media such as RAM, hard disk or any other optical or magnetic media. The servers 105, 110 include a plurality of hardware, software, and/or firmware components operating together to provide or implement a plurality of functional, operational or service-oriented modules. In some embodiments, web server 105 and game server 110 are combined. In some embodiments, web server 105 and game server 110 are separate. In some embodiments, some modules and components of web server 105 and game server 110 are integrated.

In some embodiments, the game server 110 includes or is in communication with a game database system 130. The game database system 130 stores game data associated with at least one interactive multimedia game, such as a video game, that is delivered or provided to the client devices 120 over the network 125 upon request or confirmation by a user. In some embodiments, the game server 110 may be implemented by a cloud of computing platforms operating together as game servers 110. In some instances, the game server 110 may be associated with a proprietary gameplay network system, such as, without limitation, SONY PLAYSTATION NETWORK®, MICROSOFT XBOX LIVE®, and/or another type of gameplay network system. In this implementation, a given client device 120 may be associated with a particular type of gaming console. Other types of client devices 120 using other types of gameplay networks may be used as well.

In some embodiments, the web server 105 includes or is in communication with a video program broadcasting/streaming system 135. Broadcasting/streaming system 135 may include one or more of a cable system, a satellite system, an over-the-top (OTT) streaming service, an app-based streaming system, an over the air broadcast system, or any other system that may be a source of streaming content. In some embodiments, system 135 is a satellite system for broadcasting or streaming programs for viewing by users of client devices 120. In some embodiments, users subscribe to video programs broadcast/streamed by the system 135 through the web server 130. In some embodiments, the system 135 comprises a database that stores one or more programs that may be requested for viewing by the users of client devices 120, through the web server 130 and over the network 125 via one or more GUIs (Graphical User Interfaces). In some embodiments, the web server 105 may be implemented by a cloud of computing platforms operating together as web servers 105. In some embodiments, at least one or both of web server 105 and game server 110 are in communication with one or more computing devices (not shown) that enable a person or a group of persons to interface with the programs executed by web server 105. The computing device may be configured on a handheld device, a personal computer (for example, a desktop computer, a laptop computer), a smartphone, a tablet computing device, or any other type of computing device that may be used to interface with and analyze content of broadcasting/streaming system 135, web server 105, and game server 110.

The client device 120 may be configured as a handheld gaming device, a personal computer (for example, a desktop computer, a laptop computer), a smartphone, a tablet computing device, a smart television, a personal assistant device such as Amazon Alexa or Google Home, and/or other device that can be used to interact with an instance of an interactive multimedia challenge. The client device 120 may include one or more processors, one or more storage devices, one or more peripherals, and/or other components. The processors may be programmed by one or more computer program instructions. The various computer program instructions may be stored in a storage device which may comprise random access memory (RAM), read only memory (ROM), and/or other memory. The storage device may store the computer program instructions to be executed by the processor as well as data that may be manipulated by the processor. The storage device may comprise floppy disks, hard disks, optical disks, tapes, or other storage media for storing computer-executable instructions and/or data.

The network 125 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other figures, different numbers of entities than those depicted may be used. Furthermore, according to various implementations, the components described herein may be implemented in hardware and/or software employed for configuring the hardware.

The various database systems 130, 135 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. A blockchain may also be used. The database may comprise one or more such databases that reside in one or more physical devices and in one or more physical locations. The database may store a plurality of types of data and/or files and associated data or file descriptions, administrative information, or any other data.

Those skilled in the art may appreciate that the various modules described hereinafter, used to implement the embodiments of the present specification, may be incorporated in one or more of web server 105, game server 110, and client device 120. In some embodiments, these modules may be distributed between web server 105 and game server 110. In some embodiments, these modules are incorporated in client device 120. Therefore, while the following description is provided in context of one type of arrangement of modules within environment 100, various other implementations are envisioned.

In some embodiments, the at least one game server 110 provides or implements a plurality of modules, such as, but not limited to, a first game module 112, a creation module 114, and a modification module 116. In some embodiments, the at least one web server 105 provides or implements a plurality of modules, such as, but not limited to, an interface module 142, an analysis module 144, a recommendation module 146, and a second game module 148. It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game and business database systems 130, 135, and executed by a processor.

In embodiments, the interface module 142 is configured to interface with the system 135, the client device 120, the game server 110, and the computing devices that may be used by one or more persons to execute the function of interface module 142. Interface module 142 is also configured to receive and process requests from the users to view selected programs and interface between the video program broadcast/streaming system 135 and the client devices 120 to display or present the selected programs to the users through at least one graphical user interface (GUI). Additionally, interface module 142 is configured to send recommendations to the client devices 120 through one or more GUIs to engage in interactive multimedia games based on a viewing history of the users, receive an acknowledgment from the client devices 120 that confirm whether the users have opted to engage, and present or display the recommended interactive multimedia game to the users through the one or more GUIs. Further, the interface module 142 is configured to interface with the game server 110 to send information about contextual interactive multimedia games related to the programs being viewed by the user, and receive responses from the game server 110. In some embodiments, responses from the game server 110 are in the form of the interactive multimedia game content that is presented or displayed to the respective users. In some embodiments, the responses from the game server 110 comprise an acknowledgement that the respective client devices 120 are being presented with the interactive multimedia games opted by their users. In this embodiment, the game server 110 communicates with the client devices to present the interactive multimedia games directly to the users.

In embodiments, the analysis module 144 is configured to analyze the one or more programs viewed by the users at client devices 120. In various embodiments, the analysis includes identification of a context of a program viewed by a user at a client device 120. In an embodiment, the analysis module 144 receives, extracts, and processes metadata associated with the video program to generate a contextual indication. For example, the analysis module 144 may be configured to 1) receive metadata indicative of the type or name of the video program being viewed by the user, 2) using the metadata, access a social media network feed, such as Twitter or Instagram, associated with the video program, 3) semantically parse the social media network feed to identify an event, such as the scoring of a goal, the death of a character, the introduction of a character, the victory of a participant, the loss of a participant, the completion of some objective or any occurrence that has, associated with it, a reaction on social media in excess of a threshold value, and 4) define the contextual indication based on an output of the semantic parsing. It should be appreciated that, for a given type of program, there are a certain set of standard parameters which may be used to provide the context or contextual indication. For example, for a sporting or esporting event, the contextual indication may be provided by the following parameters: who is playing, score, score/lead change(s), the identity of the players currently playing in game, the identity of the players not currently playing in game, key actions that lead to changes in the score, key actions that lead to penalties or other disadvantages in the game, and/or the identity of the players who performed one or more such action(s).

Another example of the interaction could be watching the NBA finals between the Lakers and Celtics. Users can play a basketball videogame during the NBA finals broadcasts. If a particular player or team gets a block, then gamers using that player or team might get a boost to the blocking stat for a predefined period of time.

It should further be appreciated that a reaction on social media in excess of a threshold value may be measured in terms of engagement, such as comments, retweets, likes, reposts, or other engagement-related metrics that indicate that the event is of interest to an audience above an average (or one or two standard deviations) engagement level for a generic version of the same type of video program.

For example, if a user is watching the World Cup, the analysis module 144 would extract, from the metadata, an indication that the video program is the World Cup, would connect to a social network feed associated with the World Cup, would monitor, and semantically parse, updates, such as the scoring of a goal, as they are announced on the social feed, and would generate a contextual indication ("goal event") based on the data acquired from the metadata and/or social feed. The event could also be an action by a player that elicits a reaction in social media in excess of a threshold value, such as an acrobatic save by a goalie, which causes a level of comments, likes, reposts, retweets, tweets, or other indices of engagement that is above an average level of engagement (or one or two standard deviations) for a generic version of the program.

In one embodiment, various functions of the analysis module 144 are executed by a person or a group of persons operating the one or more computing devices in communication with web server 105. The person(s), hereinafter also termed as operator(s), may perform the analysis manually. The operator(s) may also watch the one or more programs viewed by the users at client devices 120 and manually look for events. Other sources such as channels including, but not limited to ESPN or news sites can also be mined by the operator(s) in real time for events, irrespective of whether a user is watching them or not. The one or more programs themselves can also be mined using programmatic methods, such as but not limited to basic Artificial Intelligence (AI) that "reads" the score on a sports telecast or "listens" for particular events, where the "reading" and "listening" includes mining for contextual indication from metadata. Some or a portion of the functions configured to be implemented by modules 142 and 144 and described herein may, in some embodiments, be manually controlled by the operator(s). In some embodiments, all functions are manually controlled by the operator(s) through their computing device(s). In some embodiments, a combination of manual intervention by the operator(s) and AI is used to implement the functions of modules 142 and 144.

In embodiments, the metadata may include a name of the video program, a genre of the program, or a sporting event with names of the participating players or teams. For example, a contextual indication determined by the analysis module 144 may include 'sports' if the metadata comprises data indicative of a sports program; 'action' if the metadata comprises data indicative of an action movie or series; 'war' if the metadata comprises data indicative of a war movie or series; 'football' if the metadata comprises data indicative of a football game; 'baseball' if the metadata comprises data indicative of a World Series game or playoff game; 'racing' if the metadata comprises data indicative of the Indy500, or any other racing event.

In another embodiment, the analysis module 144 is configured to access a social media stream of the video program being viewed in order to obtain a real-time update of the events that occur during the video program while the user is viewing it and translate the real-time update(s) being posted on social media to one or more contextual indicators or descriptors which may later be used to identify one or more corresponding video games.

In embodiments, the analysis module 144 matches the contextual indicator of the video program with metadata associated with one or more video games accessible via the game server 110. In embodiments, the recommendation module 146 is configured to prompt the interface module 142 to present or display to the user a recommendation to engage in a specific interactive multimedia game matched by analysis module 144 through a second GUI on either the client device 120 or another client device, while the user is viewing a program on the client device 120 through a first GUI. In some embodiments, the second GUI is in the form of picture-in-picture (PIP), displayed over the video program being viewed by the user, on client device 120. In embodiments, the recommendation module recommends to the user to engage in one or more interactive multimedia games whose metadata semantically matches with the generated contextual indicators of the video program. In some alternative embodiments, analysis module 144 may match one or more interactive multimedia games with the video program being viewed by the user. In some embodiments, one or more operators manually match one or more interactive multimedia games with the video program being viewed by the user. In one exemplary embodiment, the operator(s) announce an event that the occurrence of certain events during a sports game, such as Overwatch League Finals, will trigger certain interactions for those playing a matching game. At the occurrence of one of the announced events, interface module 142 is prompted to present or display to the user an interactive recommendation to engage in a matching multimedia game. The recommendation comprises at least one textual, graphical and/or multimedia teaser, punch line or commercial, at least one icon (such as, but not limited to, a 'play' or a 'challenge accepted' button) to solicit the user's response of acceptance of the recommendation. In embodiments, the recommendation data includes one or more universal resource locators (URLs), pointing to one or more interactive multimedia games (stored in the game database system 130). In embodiments, the plurality of interactive multimedia game elements is accessible to the recommendation module 146.

In embodiments, the game module 148 is configured to generate the recommended interactive multimedia game if the recommendation is accepted by the user. In some embodiments, the game module 148 may also initiate a modification of the interactive multimedia game while the user is engaged with the game, based on events in the program, where the events are analyzed by the analysis module 144, in real time during the program, as described above. The game server 110 may accordingly respond to the initiation by the game module 148, by providing additional content for the ongoing interactive multimedia game.

More specifically, the game server 110 may provide any one of the following in respond to the determined context, as described above: increased or decreased power, points, health, treasure, or weapons in response to a player engaging in certain actions within the video game (where the actions relate to the determined context), making certain players available or not available within the video game (where the players relate to the determined context), providing more power, points, health, treasure, or weapons to one type of player within the video game (where the one type of player relates to the determined context), and making certain levels or gameplay scenarios available or not available within the video game (where the levels or scenarios relate to the determined context).

For example, the game server 110 may provide additional power to the user's players, if the user is playing as Spain in a soccer videogame and watching Spain on a live soccer match presented on the client device 120 and if Spain scores a goal in the live match. In another example, the game server 110 may provide an in-game effect in the user's first person shooter (FPS) game when the user's local FPS team wins a match in an e-sports stream that the user is watching. In yet another example, a reward or a point or a bonus may be generated for the user while the user is playing a game in context of a program when a favorable event occurs in the program during game play. In one exemplary embodiment, a score achieved by a user-favored team in a sport event triggers a change in coding for scoring for the user. Similar changes to the coding may be triggered based on other favorable events, such as for example scores achieved by a team of the same geography as that of the user. In another example, a user may be watching the NBA finals between the Lakers and Celtics and concurrently playing a basketball videogame during the NBA broadcast. If a particular player gets a block or team scores a three pointer, then the user using that blocking player or playing as that scoring team in the video game might receive, via the game server, a boost to the user's player's blocking stat for a predefined period of time or to the user's players' three point shooting accuracy for a predefined period of time. It should be appreciated that all of the aforementioned changes may be subject to predefined, limited time periods that are shorter than the video game or live event itself.

In embodiments, examples of the interactive multimedia games include, and are not limited to, a puzzle, mini-video game, time-bound video game (that is, a video game that must be played and won within the constraints of a predetermined time), sports games, board game, multiplayer online game, first person shooter game, arcade game, action and adventure game, casino game, card game, strategy game, shooting game, racing game, and simulations.

In embodiments, the game module 112 is configured to execute an instance of an online interactive multimedia game which is displayed on the user's client device 120 to facilitate interaction of the user with the game. The game module 112 controls aspects of the game for the user and receives and processes the user's interactions in the game. Stated differently, the game module 112 hosts and renders the online game for the user, receives game data from the client device 120 and transmits updates to the client device 120 based on the received game data so that the game, on the client device 120, represents the most updated or current status with reference to interactions of the user with the game. In some embodiments, game modules 112 and 148 are integrated in to a single game module.

In embodiments, the online interactive multimedia game is rendered, displayed or presented to the user in any one of a first, second or third interactive interface. The first interactive interface corresponds to the online interactive multimedia game being rendered, displayed or presented to the user as an interface embedded within a webpage on the user's client device 120. In such embodiments, the first interactive interface is implemented as a rich internet application using tools (that enable interactivity along with a functionality to communicate the user's interactions and outcomes to the game server 110) such as, but not limited to, Adobe Flash, WebGL, JavaScript, Java Applet, ActiveX, and Curl. The second interactive interface corresponds to the online interactive multimedia game being rendered, displayed or presented to the user as a video playback on a native media player on the client device 120. In such embodiments, a plurality of client-side program instructions (for example, using JavaScript) may be utilized to control and monitor the user's interaction with the game. The third interactive interface corresponds to the online interactive multimedia game being rendered or presented to the user through a downloadable executable file (client-side component) which when activated (post-download on the client device 120) operates as a gaming application that provides the user with an interactive interface between the user and the game. In embodiments, the gaming application is in data communication with the game module 112 that controls the virtual environment of the gaming application and acquires the user interactions with the game rendered through the gaming application. It should be appreciated that the first, second and third interactive interfaces are exemplary and in no way limiting.

The interactive interfaces, for rendering the online interactive multimedia game, capture and process user inputs and interactions within the virtual environment and provide updates to the game server 110 over the network 125. In embodiments, the game module 112 captures and stores (in the game database system 130) a plurality of performance or outcome data generated as a result of the user's interactions with the virtual environment of the game. The performance data is communicated back or uploaded to the game server 110 in real-time or periodically (such as through batch updates) during a game and/or at an end of the game.

In embodiments, the creation module 114 is configured to create an interactive multimedia game based on context of a program identified by the analysis module 144. In an embodiment the interactive multimedia game is created in real time to reflect an experience, or moment, or event, of the program being viewed by the user, and analyzed by the analysis module 144. For example, when a World cup television program shows penalty kicks, a mini game of penalty kicks is created by the creation module 114, to reflect the moment of penalty kicks, and presented to the user through game module 112. In another example, the creation module 114 creates for the user a FPS mini game that recreates a combat scenario that the user may have just viewed in a movie.

In embodiments, the modification module 116 is configured to modify instances of the interactive multimedia game rendered to the user in real time, based on real time events occurring in the program being viewed by the user and identified by the analysis module 144. The modification module 116 may respond to the event, by providing additional content for the ongoing interactive multimedia game. For example, the modification module 116 provides power for the user's players if the user is playing as Spain in a soccer videogame and watching Spain on a live soccer match presented on the client device 120 when they score a goal in the live match. In another example, the modification module 116 provides an in-game effect in the user's FPS game when the user's local FPS team wins a match in an e-sports stream that the user is watching. In yet another example, a reward or a point or a bonus is generated for the user while the user is playing a game in context of a program when a favorable event occurs in the program during game play.

Figure 2:
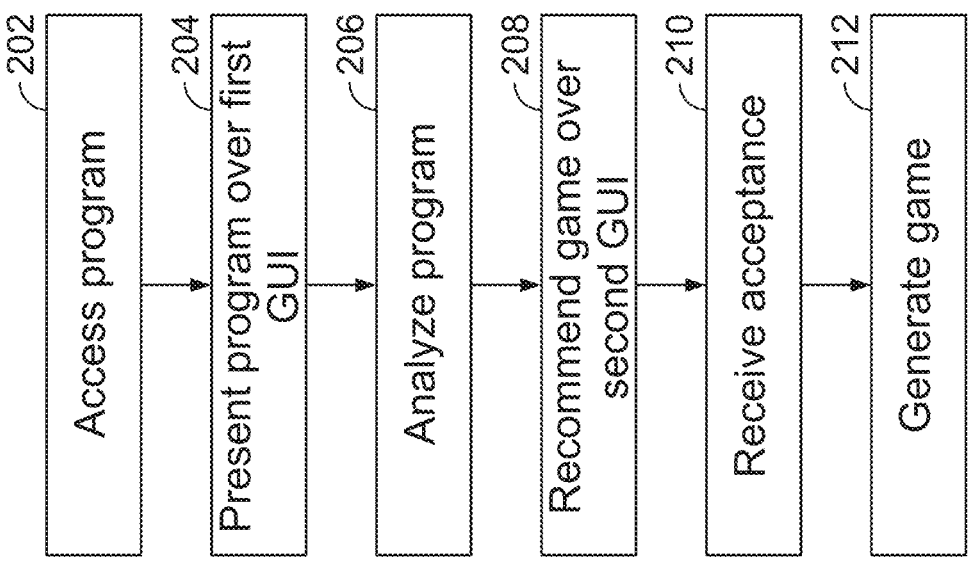
FIG. 2 is a flowchart illustrating an exemplary process for implementing an interactive multimedia game in the context of a program, in accordance with some embodiments of the present specification.
Figure 3:
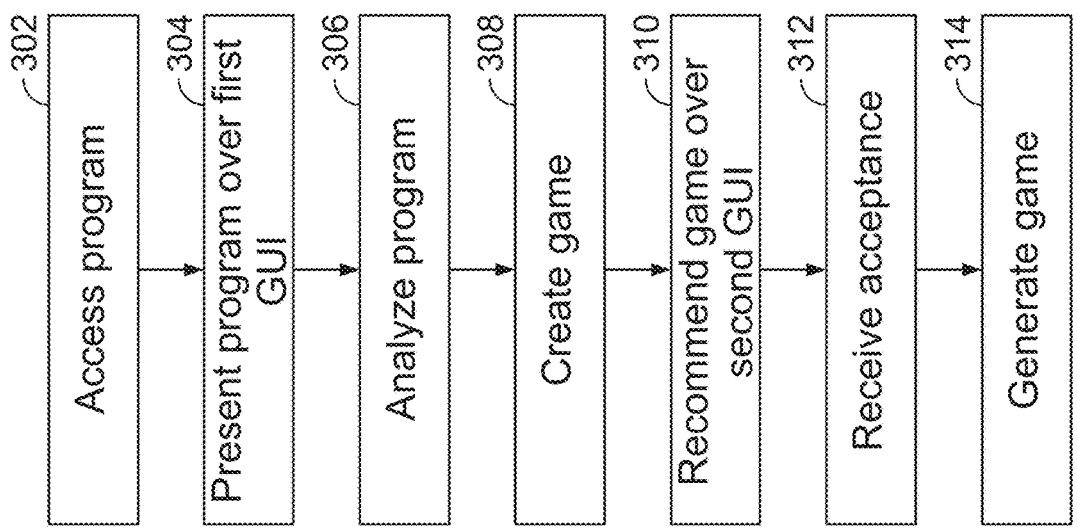
FIG. 3 is a flowchart illustrating an exemplary process for creating and implementing an interactive multimedia game in the context of a program, in accordance with another embodiment of the present specification.
Figure 4:
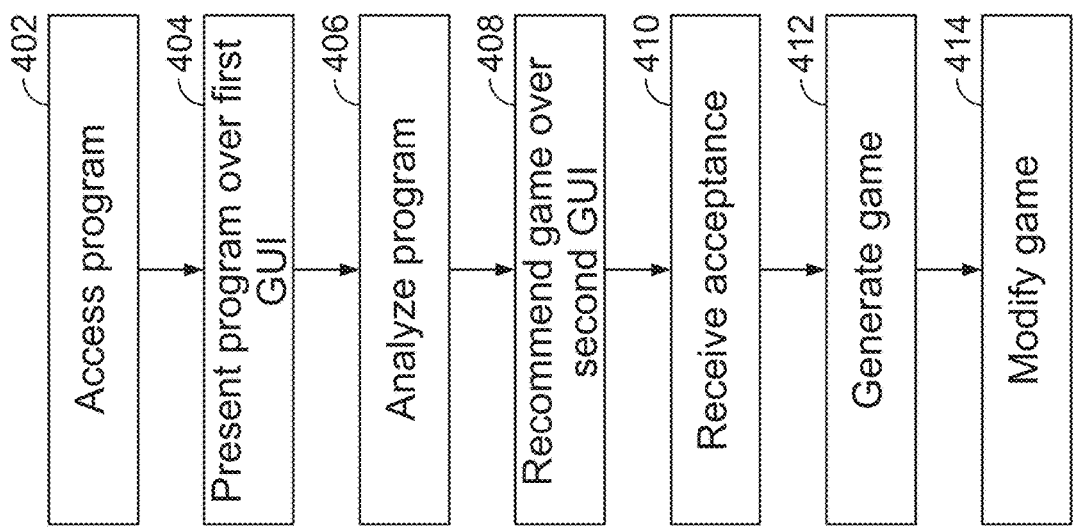
FIG. 4 is a flowchart illustrating an exemplary process for modifying and implementing an interactive multimedia game in the context of a program, in accordance with yet other embodiments of the present specification.

FIGS. 2, 3, and 4 are flow charts illustrating exemplary processes for implementing interactive multimedia games in the context of a program being viewed, in accordance with some embodiments of the present specification. The described processes may be accomplished using at least one or a plurality of the system components described in detail above and, in some implementations, various steps may be performed in different sequences and various steps may be omitted. Additional steps may be performed along with some or all of the steps shown in the depicted flow chart. One or more steps may be performed simultaneously. Accordingly, the steps as illustrated (and described in greater detail below) are exemplary by nature and, as such, should not be viewed as limiting.

FIG. 2 is a flow chart illustrating an exemplary process for implementing an interactive multimedia game in the context of a video program being viewed, in accordance with some embodiments of the present specification. Referring simultaneously to FIGS. 1 and 2, according to aspects of the present specification, at step 202, a user accesses (via the network 125) a video program broadcast/streaming by system 135, and hosted and managed by the web server 105. In some embodiments, the user is a registered member and hence uniquely identifiable by way of a login ID. In embodiments, the web server 105 tracks the user's activities using the user's login ID and/or the IP (Internet Protocol) address of the client device 120 that the user uses to connect to the web server 105. In some embodiments, the video program may be accessed through a software application residing on a user's device, for example, an application running on a user's personal computer, mobile phone, or video game console.

At step 204, as a result of the user's request to view the video program, the video program is presented to the user on a first GUI screen. At step 206, the user is identified and the video program viewed by the user is analyzed by the analysis module 144, as described above. A context of the video program being viewed is identified. The context is used to match a game from the game database 130 through the game server 110. In some embodiments, the context is identified from information about the video program. For example, in a sports program the context may be identified from information such as, and not limited to, who is playing, score, score/lead change, players currently in game, which players just performed an action, and any other event in the video program. In another example, the user may be watching NBA finals between the Lakers and Celtics. The matching game has a similar context as the video program. In this example, the context may be basketball game. In subsequent steps, the user can play a basketball videogame during the NBA finals broadcasts. If a particular player or team gets a block, then gamers using that player or team might get a boost to the blocking stat for a predefined period of time. At step 208, based on the identified context, the user is presented with a recommendation to engage with an interactive multimedia game that matches the video program context, over a second GUI screen. In some embodiments, the second GUI screen is overlaid on the first GUI screen either in part or in whole, such that the user is able to view the second GUI screen concurrently with the video program, but via a separate media channel. In some embodiments, the recommendation is configured as an advertisement that, if activated by the user (such as by clicking a 'play' button of the advertisement), allows the user to play the online interactive multimedia game. In embodiments, examples of the interactive multimedia games include, and are not limited to, a puzzle, mini-video game, time-bound video game (that is, a video game that must be played and won within the constraints of a predetermined time), board game, multiplayer online game, first person shooter game, arcade game, action and adventure game, casino game, card game, strategy game, shooting game, sport game, and simulation.

The user may opt to engage with the recommended game by clicking the option to accept the recommendation. If the user decides to accept the recommendation then, the user clicks on a 'play' button on the second GUI screen, so that the acceptance is received by the web server 105. In response, at step 212, the user is connected to the game server 110 to enable the user to play the online interactive multimedia game over the second GUI screen. In embodiments, the online interactive multimedia game is presented to the user within an interactive interface on the user's client device 120. As discussed earlier in this specification, the online interactive multimedia game may be rendered in any one of first, second or third interactive interface formats, wherein in the first format the game may be presented in an interface embedded within the GUI screen, wherein in the second format the game is presented as a multimedia playback using a media player native or residing on the client device 120 and wherein in the third format an executable program file is downloaded on the client device 120 which when activated presents an interface of a client-side gaming application. In some embodiments, the interactive multimedia game is a mini-game that can be played within a stipulated predetermined time frame.

FIG. 3 is a flow chart illustrating an exemplary process for implementing an interactive multimedia game in the context of a video program being viewed, in accordance with some other embodiments of the present specification. Referring simultaneously to FIGS. 1 and 3, according to aspects of the present specification, at step 302, a user accesses (via the network 125) a video program broadcast/streaming by system 135, and hosted and managed by the web server 105. In some embodiments, the user is a registered member and hence uniquely identifiable by way of a login ID. In embodiments, the web server 105 tracks the user's activities using the user's login ID and/or the IP (Internet Protocol) address of the client device 120 that the user uses to connect to the web server 105. In some embodiments, the video program may be accessed through a software application residing on a user's device, for example, an application running on a user's personal computer, mobile phone, or video game console.

At step 304, as a result of the user's request to view the video program, the video program is presented to the user on a first GUI screen. At step 306, the user is identified and the video program viewed by the user is analyzed by the analysis module 144. A context of the video program being viewed is identified. In some embodiments, the context is identified from information about the video program. For example, in a sports program the context may be identified from information such as, and not limited to, who is playing, score, score/lead change, players currently in game, which players just performed an action, and any other event in the video program. In another example, the user may be watching NBA finals between the Lakers and Celtics. In this example, the context may be basketball game. In subsequent steps, the user can play a basketball videogame during the NBA finals broadcasts. If a particular player or team gets a block, then gamers using that player or team might get a boost to the blocking stat for a predefined period of time. At step 308, the context is communicated to the game server 110 and is used to create a game of a matching context. In embodiments, the creation module 114 creates the interactive multimedia game based on context of the video program identified by the analysis module 144. In an embodiment the interactive multimedia game is created in real time to reflect an experience, or moment, or event, of the video program being viewed by the user, and analyzed by the analysis module 144. For example, when a World cup video program shows penalty kicks, a mini game of penalty kicks is created by the creation module 114, to reflect the moment of penalty kicks, and presented to the user through game module 112. In another example, the creation module 114 creates for the user a FPS mini game that recreates a combat scenario that the user may have just viewed in a movie. At step 310, based on the identified context, the user is presented with a recommendation to engage with the created interactive multimedia game that matches the video program context, over a second GUI screen. In some embodiments, the second GUI screen is overlaid on the first GUI screen either in part or in whole, such that the user is able to view the second GUI screen concurrently with the video program. In some embodiments, the recommendation is configured as an advertisement that, if activated by the user (such as by clicking a 'play' button of the advertisement), allows the user to play the online interactive multimedia game. In embodiments, examples of the interactive multimedia games include, and are not limited to, a puzzle, mini-video game, time-bound video game (that is, a video game that must be played and won within the constraints of a predetermined time), board game, multiplayer online game, first person shooter game, arcade game, action and adventure game, casino game, card game, strategy game, shooting game, sport game, and simulation.

The user may opt to engage with the recommended game by clicking the option to accept the recommendation. If the user decides to accept the recommendation then the user clicks on a 'play' button on the second GUI screen, so that, at step 312, the acceptance is received by the web server 105. In response, at step 314, the user is connected to the game server 110 to enable the user to play the online interactive multimedia game over the second GUI screen. In embodiments, the online interactive multimedia game is presented to the user within an interactive interface on the user's client device 120. As discussed earlier in this specification, the online interactive multimedia game may be rendered in any one of first, second or third interactive interface formats, wherein in the first format the game may be presented in an interface embedded within the GUI screen, wherein in the second format the game is presented as a multimedia playback using a media player native or residing on the client device 120 and wherein in the third format an executable program file is downloaded on the client device 120 which when activated presents an interface of a client-side gaming application. In some embodiments, the interactive multimedia game is a mini-game that can be played within a stipulated predetermined time frame.

FIG. 4 is a flow chart illustrating an exemplary process for implementing an interactive multimedia game in the context of a video program being viewed, in accordance with yet other embodiments of the present specification. Referring simultaneously to FIGS. 1 and 4, according to aspects of the present specification, at step 402, a user accesses (via the network 125) a video program broadcast/streaming by system 135, and hosted and managed by the web server 105. In some embodiments, the user is a registered member and hence uniquely identifiable by way of a login ID. In embodiments, the web server 105 tracks the user's activities using the user's login ID and/or the IP (Internet Protocol) address of the client device 120 that the user uses to connect to the web server 105. In some embodiments, the video program may be accessed through a software application residing on a user's device, for example, an application running on a user's personal computer, mobile phone, or video game console.

At step 404, as a result of the user's request to view the video program, the video program is presented to the user on a first GUI screen. At step 406, the user is identified and the video program viewed by the user is analyzed by the analysis module 144. A context of the video program being viewed is identified, as previously described. In some embodiments, the context is identified from information about the video program. For example, in a sports program the context may be identified from information such as, and not limited to, who is playing, score, score/lead change, players currently in game, which players just performed an action, and any other event in the video program. In another example, the user may be watching NBA finals between the Lakers and Celtics. In this example, the context may be basketball game. In subsequent steps, the user can play a basketball videogame during the NBA finals broadcasts. If a particular player or team gets a block, then gamers using that player or team might get a boost to the blocking stat for a predefined period of time. In some embodiments, an interactive multimedia game of a similar context is matched from the game database 130. In some other embodiments, the context is communicated to the game server 110 and is used to create a game of a matching context. At step 408, based on the identified context, the user is presented with a recommendation to engage with the interactive multimedia game that matches the video program context, over a second GUI screen. In some embodiments, the second GUI screen is overlaid on the first GUI screen either in part or in whole, such that the user is able to view the second GUI screen concurrently with the program, even though the game and video program are in separate media channels. In some embodiments, the recommendation is configured as an advertisement that, if activated by the user (such as by clicking a 'play' button of the advertisement), allows the user to play the online interactive multimedia game. In embodiments, examples of the interactive multimedia games include, and are not limited to, a puzzle, mini-video game, time-bound video game (that is, a video game that must be played and won within the constraints of a predetermined time), board game, multiplayer online game, first person shooter game, arcade game, action and adventure game, casino game, card game, strategy game, shooting game, sport game, and simulation.

The user may opt to engage with the recommended game by clicking the option to accept the recommendation. If the user decides to accept the recommendation then, the user clicks on a 'play' button on the second GUI screen, so that at step 410 the acceptance is received by the web server 105. In response, at step 412, the user is connected to the game server 110 to enable the user to play the online interactive multimedia game over the second GUI screen. In embodiments, the online interactive multimedia game is presented to the user within an interactive interface on the user's client device 120. The video program is continually analyzed for evolving contexts or presence of events through, for example, a semantic monitoring of a social network feed. If one or more events occur in the video program, then at step 414, they are used to modify the corresponding interactive multimedia game that the user may already be engaged with concurrently with the video program being viewed. In embodiments, the modification module 116 modifies instances of the interactive multimedia game rendered to the user in real time, based on real time events occurring in the video program being viewed by the user and identified by the analysis module 144. The modification module 116 may respond to the event, by providing additional content for the ongoing interactive multimedia game. For example, the modification module 116 provides power for the user's players if the user is playing as Spain in a soccer videogame and watching Spain on a live soccer match presented on the client device 120 when they score a goal in the live match. In another example, the modification module 116 provides an in-game effect in the user's FPS game when the user's local FPS team wins a match in an e-sports stream that the user is watching.

As discussed earlier in this specification, the video game may be rendered in any one of first, second or third interactive interface formats, wherein in the first format the game may be presented in an interface embedded within the GUI screen, wherein in the second format the game is presented as a multimedia playback using a media player native or residing on the client device 120 and wherein in the third format an executable program file is downloaded on the client device 120 which when activated presents an interface of a client-side gaming application. In some embodiments, the video game is a mini-game that can be played within a stipulated predetermined time frame.

Figure 5:
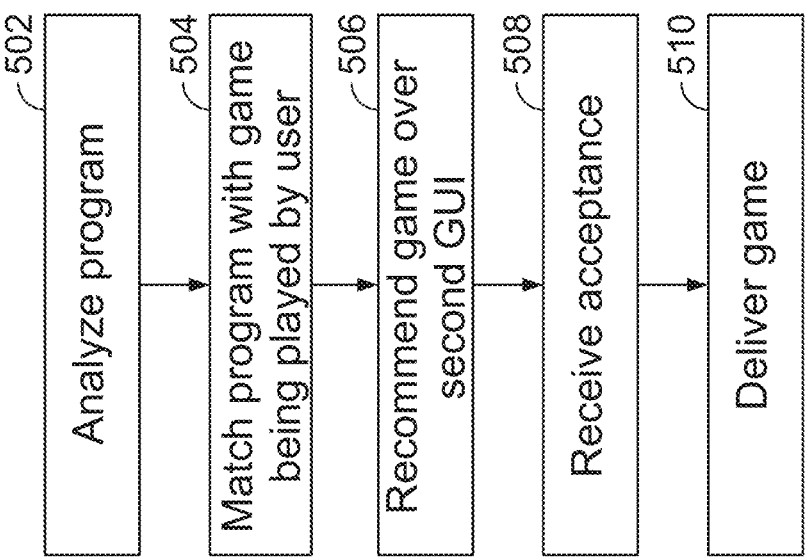
FIG. 5 is a flowchart illustrating an exemplary process for implementing an interactive multimedia game in the context of a broadcast program, in accordance with some embodiments of the present specification.

FIG. 5 is a flow chart illustrating an exemplary process for implementing an interactive multimedia game in the context of a video program being broadcast, in accordance with some embodiments of the present specification. Referring simultaneously to FIGS. 1 and 5, according to aspects of the present specification, at step 502, a video program broadcast/streaming by system 135, and hosted and managed by the web server 105, is analyzed to determine its context and one or more events that may occur in the video program. In some embodiments, the context may include information such as the geography of the video program, who is playing, score, score/lead change, players currently in game. Additionally, the one or more events may correspond to information such as and not limited to actions performed within the program, if the program is a sport then which players just performed an action, and any other event in the video program. The video program may or may not be viewed by the user during its broadcast.

In some embodiments, the user is a registered member and hence uniquely identifiable by way of a login ID. In embodiments, the web server 105 tracks the user's activities using the user's login ID and/or the IP (Internet Protocol) address of the client device 120 that the user uses to connect to the web server 105 and/or game server 110.

At step 504, the video program is matched with a game being played by the user on a first GUI screen, where the game has a similar context. For example, if the user is playing a basketball game using interactive multimedia means, then the video program containing a basketball match is matched with the user's game.

At step 506, based on the identified context, the user is presented with a recommendation to engage with an interactive multimedia game that matches the video program context, over a second GUI screen. In some embodiments, the recommendation is to engage in an interactive game corresponding to the one or more events that occur in the video program. In some embodiments, the second GUI screen is overlaid on the first GUI screen either in part or in whole, such that the user is able to view the second GUI screen concurrently with the video program, but via a separate media channel. In some embodiments, the recommendation is configured as an advertisement that, if activated by the user (such as by clicking a 'play' button of the advertisement), allows the user to play the online interactive multimedia game. In embodiments, examples of the interactive multimedia games correspond to events occurring in the broadcast video program, including and not limited to, a puzzle, mini-video game, time-bound video game (that is, a video game that must be played and won within the constraints of a predetermined time), board game, multiplayer online game, first person shooter game, arcade game, action and adventure game, casino game, card game, strategy game, shooting game, sport game, and simulation.

At step 508, the user may opt to engage with the recommended game by clicking the option to accept the recommendation. If the user decides to accept the recommendation then, the user clicks on a 'play' button on the second GUI screen, so that the acceptance is received by the web server 105. In response, at step 510, the user is connected to the game server 110 to enable the user to play the online interactive multimedia game over the second GUI screen. In embodiments, the online interactive multimedia game is presented to the user within an interactive interface on the user's client device 120. As discussed earlier in this specification, the online interactive multimedia game may be rendered in any one of first, second or third interactive interface formats, wherein in the first format the game may be presented in an interface embedded within the GUI screen, wherein in the second format the game is presented as a multimedia playback using a media player native or residing on the client device 120 and wherein in the third format an executable program file is downloaded on the client device 120 which when activated presents an interface of a client-side gaming application. In some embodiments, the interactive multimedia game is a mini-game that can be played within a stipulated predetermined time frame.

Figure 6:
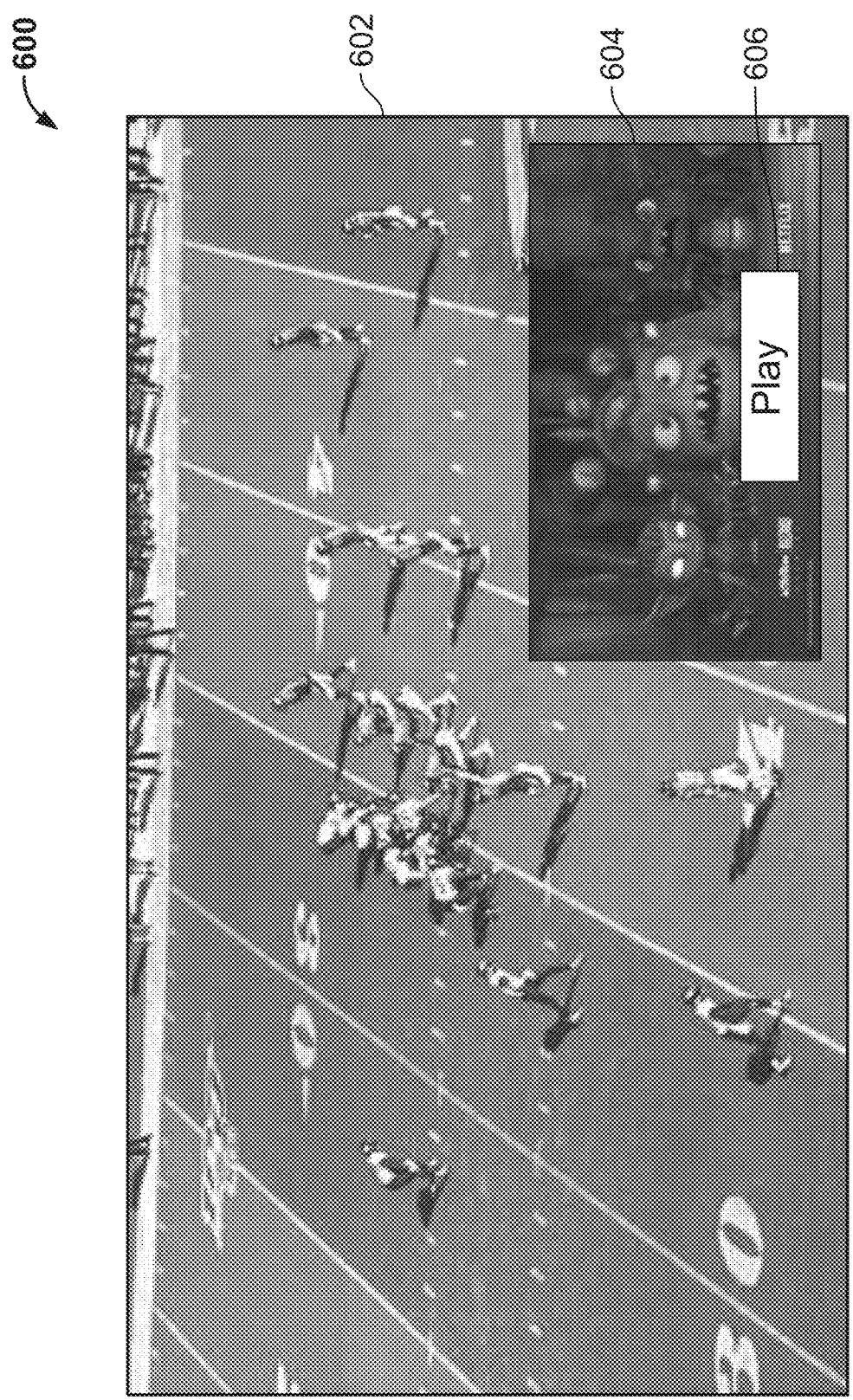
FIG. 6 is an exemplary Graphical User Interface (GUI) illustrating a first screen and a second screen, in accordance with the various embodiments of the present specification.

FIG. 6 is an exemplary Graphical User Interface (GUI) 600 that includes a first screen 602 and a second screen 604, in accordance with the various embodiments of the present specification. First screen 602 displays to a user a video program, a broadcast, or a streamed video to the user on the user's client device. Second screen 604 is generated in response to an analysis of the content viewed by the user through first screen 602. In different embodiments, described in context of FIGS. 1 through 5, second screen 604 displays a recommendation to the user to engage with a game, or encourages the user to engage with a game that the user may have already been playing. In some embodiments, the second screen 604 is overlaid on the first GUI screen 602 either in part or in whole, such that the user is able to view the second screen 604 concurrently with the video program, but via a separate media channel. In some embodiments, the recommendation is configured as an advertisement that, if activated by the user (such as by clicking a 'play' button 606 of the advertisement), allows the user to play the online interactive multimedia game. In embodiments, examples of the interactive multimedia games include and are not limited to, a puzzle, mini-video game, time-bound video game (that is, a video game that must be played and won within the constraints of a predetermined time), board game, multiplayer online game, first person shooter game, arcade game, action and adventure game, casino game, card game, strategy game, shooting game, sport game, and simulation.

The user may opt to engage with the recommended game by clicking the option to accept the recommendation. If the user decides to accept the recommendation then, the user clicks on a 'play' button 606 on the second screen 604. In response, the user is enabled to play the online interactive multimedia game on second screen 604. In embodiments, the online interactive multimedia game is presented to the user within an interactive interface on the user's client device. As discussed earlier in this specification, the online interactive multimedia game may be rendered in any one of first, second or third interactive interface formats, wherein in the first format the game may be presented in an interface embedded within the screen 604, wherein in the second format the game is presented as a multimedia playback using a media player native or residing on the client device and wherein in the third format an executable program file is downloaded on the client device which when activated presents an interface of a client-side gaming application.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A computer implemented method for generating an interactive multimedia video game for a user during a viewing of a video program by the user, the method being implemented in a host computer having one or more physical processors programmed with computer program instruction that, when executed by the one or more physical processors, cause the host computer to perform the method, the method comprising:

receiving metadata associated with the video program, wherein the video program is delivered to the user through a first media channel and viewed through a first graphical user interface;

semantically analyzing the metadata to determine a context of the video program;

based on the context of the video program, and while the video program is still being displayed through the first graphical user interface, recommending an interactive multimedia game and generating a second graphical user interface, via a second media channel, to display the recommendation, wherein the recommendation comprises a first option associated with engaging in the interactive multimedia game and wherein the second graphical user interface is overlaid on a portion of the first graphical user interface such that the video program in the first graphical user interface remains visible;

receiving, at the host computer, data indicative of whether the user selected the first option; and using the host computer, delivering, through the second media channel, the interactive multimedia game if the data is indicative of the user selecting the first option, wherein the first media channel is defined by a first application layer, a first presentation layer, a first session layer, a first transport layer, a first network layer, a first data link layer, and a first physical layer, wherein the second media channel is defined by a second application layer, a second presentation layer, a second session layer, a second transport layer, a second network layer, a second data link layer, and a second physical layer, and wherein at least one of the first application layer differs from the second application layer, the first presentation layer differs from the second presentation layer, the first session layer differs from the second session layer, the first transport layer differs from the second transport layer, the first network layer differs from the second network layer, the first data link layer differs from the second data link layer, or the first physical layer differs from the second physical layer.

2. The computer implemented method of claim 1 wherein recommending the interactive multimedia game further comprises identifying the interactive multimedia game based on the context of the program from a game database.

3. The computer implemented method of claim 1 wherein the video program is at least one of a broadcast television or Internet-based streaming program.

4. The computer implemented method of claim 1 further comprising accessing a social network feed based on the metadata.

5. The computer implemented method of claim 4 further comprising semantically analyzing the social network feed to determine the context of the video program.

6. The computer implemented method of claim 1 wherein the interactive multimedia game is configured as a downloadable executable that, if activated by the user, allows the user to engage with the interactive multimedia game.

7. The computer implemented method of claim 1 wherein the interactive multimedia game is configured as a scripted advertisement that, if activated by the user, allows the user to engage with the interactive multimedia game.

8. The computer implemented method of claim 1, further comprising, using the host computer, directing the user to a game server if the user interacts with the second graphical user interface.

9. The computer implemented method of claim 1, wherein the semantically analyzing the metadata to determine a context of the video program comprises determining at least one event in the video program.

10. The computer implemented method of claim 9, wherein determining the at least one event comprises determining one or more of identity of persons in the video program, actions performed in the video program, and goals achieved in the video program.

11. A computer implemented method for generating an interactive multimedia game for a user during a viewing of a video program by the user, the method being implemented in a host computer having one or more physical processors programmed with computer program instruction that, when executed by the one or more physical processors, cause the host computer to perform the method, the method comprising:
receiving metadata associated with the video program, wherein the video program is delivered to the user through a first media channel and viewed through a first graphical user interface, wherein the program is viewed on a first graphical user interface;
analyzing the metadata to determine a context of the video program;
creating an interactive multimedia game based on the context of the program;
based on the context of the video program, recommending the interactive multimedia game and generating a second graphical user interface, via a second media channel, to display the recommendation while the video program is still being displayed through the first graphical user interface, wherein the recommendation comprises a first option associated with engaging in the interactive multimedia game and wherein the second graphical user interface is overlaid on a portion of the first graphical user interface such that the video program in the first graphical user interface remains visible;
receiving, at the host computer, data indicative of whether the user selected the first option;
using the host computer, delivering, through the second media channel, the interactive multimedia game if the data is indicative of the user selecting the first option, wherein the first media channel is defined by a first application layer, a first presentation layer, a first session layer, a first transport layer, a first network layer, a first data link layer, and a first physical layer, wherein the second media channel is defined by a second application layer, a second presentation layer, a second session layer, a second transport layer, a second network layer, a second data link layer, and a second physical layer, and wherein at least one of the first application layer differs from the second application layer, the first presentation layer differs from the second presentation layer, the first session layer differs from the second session layer, the first transport layer differs from the second transport layer, the first network layer differs from the second network layer, the first data link layer differs from the second data link layer, or the first physical layer differs from the second physical layer.

12. The computer implemented method of claim 11 wherein recommending the interactive multimedia game further comprises identifying the interactive multimedia game based on the context of the program from a game database.

13. The computer implemented method of claim 11 further comprising accessing a social network feed based on the metadata.

14. The computer implemented method of claim 13 further comprising semantically analyzing the social network feed to determine the context of the video program.

15. The computer implemented method of claim 11 wherein the interactive multimedia game is configured as a downloadable executable that, if activated by the user, allows the user to engage with the interactive multimedia game.

16. The computer implemented method of claim 11 wherein the interactive multimedia game is configured as a scripted advertisement that, if activated by the user, allows the user to engage with the interactive multimedia game.

17. The computer implemented method of claim 11 further comprising, using the host computer, directing the user to a game server if the user interacts with the second graphical user interface.

18. The computer implemented method of claim 11 wherein the analyzing the metadata to determine a context of the video program comprises determining at least one event in the video program.

19. The computer implemented method of claim 18 wherein determining the at least one event comprises determining one or more of identity of persons in the video program, actions performed in the video program, and goals achieved in the video program.

* * * * *